United States Patent [19]
Porter et al.

[11] 3,789,667
[45] Feb. 5, 1974

[54] FIBER OPTIC PRESSURE DETECTOR

[75] Inventors: John H. Porter, Colchester Point; David B. Murray, Cambridge, both of Vt.

[73] Assignee: Ladd Research Industries, Inc., Burlington, Vt.

[22] Filed: Feb. 14, 1972

[21] Appl. No.: 225,881

[52] U.S. Cl............. 73/406, 73/398 R, 128/2.05 D, 350/96 B
[51] Int. Cl......... G01l 7/08, G01d 5/30, A61b 5/02
[58] Field of Search...... 73/398 R, 406; 128/2.05 D, 128/2.05 E, 2.05 N, 2.05 R; 350/96 B

[56] References Cited
UNITED STATES PATENTS

| | | | |
|---|---|---|---|
| 3,215,135 | 11/1965 | Franke | 73/406 X |
| 3,273,447 | 9/1966 | Frank | 73/406 X |
| 3,327,584 | 6/1967 | Kissinger | 250/227 X |
| 3,580,082 | 5/1971 | Strack | 73/406 |
| 3,686,958 | 8/1972 | Porter et al. | 73/406 |
| 3,628,373 | 12/1971 | Gilbert | 73/398 R X |
| 3,714,829 | 2/1973 | Gilbert | 73/398 R |

OTHER PUBLICATIONS

Lekholm, A. et al. Technical Note – Optoelectronic Transducer for Intravascular Measurements of Pressure Variations, in Medical and Biological Engineering, Vol. 7, pp. 333–335, Pergamon Press, 1969.

Eversden, I. D. Modifications to a Miniature Pressure Transducer for the Measurement of Intracranial Pressure, in Medical and Biological Engineering, Vol. 8, pp. 159–164, Pergamon Press, 1970.

Primary Examiner—Donald O. Woodiel
Assistant Examiner—Frederick Shoon
Attorney, Agent, or Firm—William R. Hulbert

[57] ABSTRACT

A differential sensor unit precisely monitors ambient pressure within a confined space, such as intracranial pressure of a human patient, utilizing fiber optic light guides. Three light guides pass within a pneumatic line into a flexible envelope which is implanted in the skull. Of the external ends of the guides, one faces a light source and each of the others faces a light detector. Within the envelope the guide ends are so arranged with respect to light beam modulating mechanism responsive to envelope distortion due to change in relative pressure that motion of the mechanism relative to the internal ends varies the light transmitted from the first light guide internal end to each remaining light guide internal end, and consequently varies the light intensity sensed by each of the detectors. The detectors can be arranged to actuate pressure display means and pneumatic controls acting through the pneumatic line to adjust the internal pressure of the envelope.

4 Claims, 7 Drawing Figures

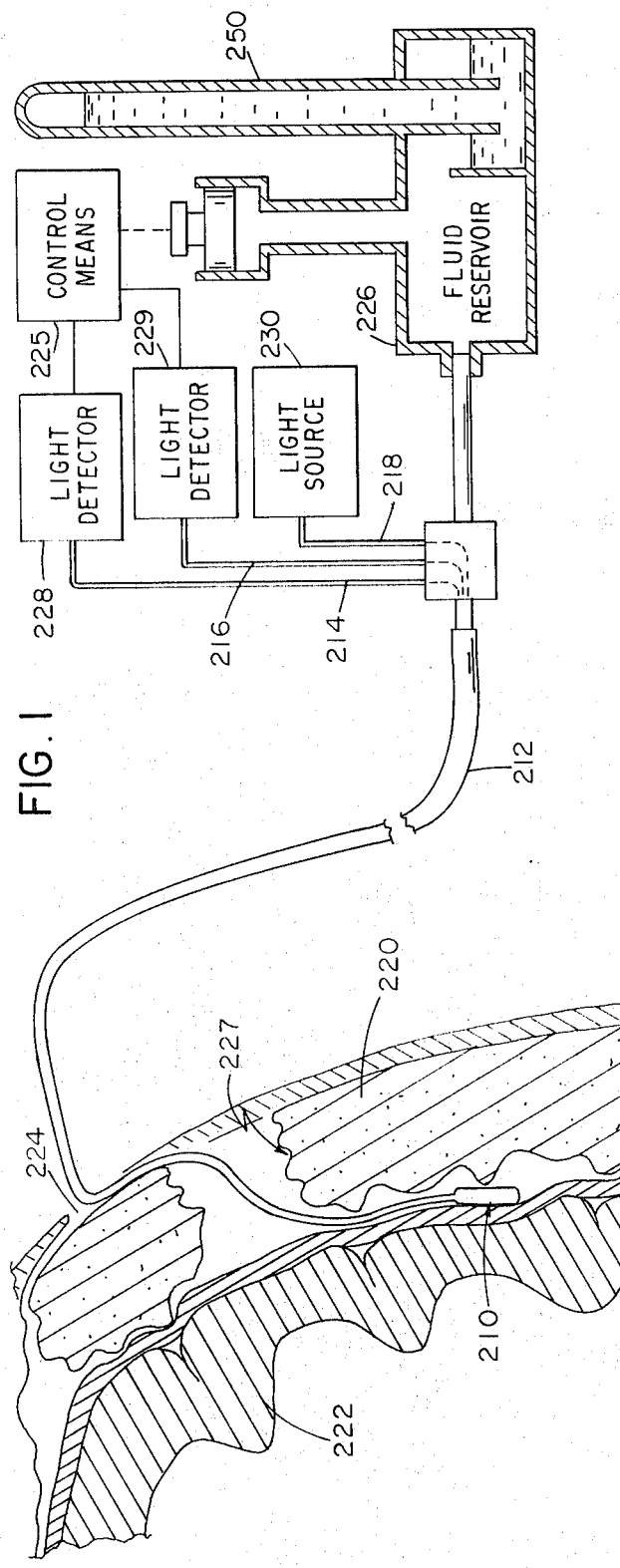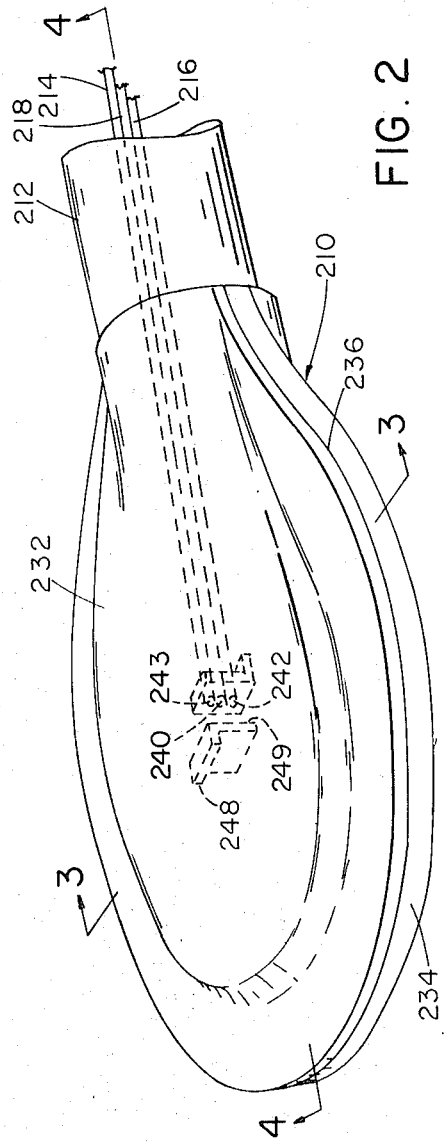

PATENTED FEB 5 1974 3,789,667

FIBER OPTIC PRESSURE DETECTOR

This invention relates to pressure measuring and monitoring devices. In particular, it relates to devices for continuously and precisely measuring pressure within a confined and relatively inaccessible space, such as the intracranial pressure of a living human being as exemplified in our copending U.S. Pat. No. 3,686,958, issued Aug. 29, 1972.

The invention features a novel differential sensor unit for use in apparatus for precisely monitoring ambient pressure within a confined space, which apparatus includes a light source, two light detectors, a source of fluid under pressure, control means for controlling the pressure of the fluid in accordance with the difference between the light intensities sensed by the detectors, and display means for displaying such pressure. The sensor unit comprises an envelope adapted to be placed within the confined space, having at least one wall movable in response to change in relative pressure between the interior and exterior of the envelope, a fluid conducting line in communication with the envelope interior and adapted to be connected to the fluid source, and three light guides each having an internal end within said envelope. The external ends of the first and second light guides each face a light detector, and the external end of the third faces the light source. A light-modulating mechanism is mounted within the envelope in operative relation to the internal ends of the light guides to vary the light transmitted from the internal end of the third light guide to the internal ends of the first and second light guides and correspondingly to vary the intensity of light sensed by each of the light detectors. The light-modulating mechanism is relatively movable with respect to the internal ends responsive to movements of the movable wall.

The internal guide ends and the light-modulating mechanism are so disposed and arranged that in a first position of the light-modulating mechanism a majority of the light from the light source is transmitted from the third light guide through the first light guide to the first light detector, in a second position of the mechanism a majority of the light is transmitted through the second light guide to the second light detector, and in a third position equal amounts of light are transmitted to the two light detectors. The light-modulating mechanism is movable through a range of positions including these first, second and third positions. In this manner the control means, acting through the pneumatic line, will adjust the internal pressure in the envelope in accordance with the difference between the light intensities sensed by the detectors, whereby the internal pressure continually spans the ambient pressure and the display means continually displays the internal pressure.

In a preferred embodiment, the light guides extend within the envelope generally parallel to the rigid wall, the internal ends being generally transverse to the wall, and disposed side by side with their faces facing in the same direction, the first internal end being adjacent the rigid wall, the second internal end being adjacent the flexible movable wall, and the third internal end being between the other two. The light modulating mechanism comprises a reflector attached to the movable wall and having a face parallel to the internals ends of the light guides. The reflector is arranged to move between a first position adjacent the first internal end, a second position adjacent the second internal end, and a third position equidistant from the first and second internal ends. The reflector serves in the first position to reflect light primarily from the third to the first internal end, and in the second position to reflect light primarily from the third to the second internal end, and in the third position to reflect light from the third internal end equally to the second and first internal ends.

When the ambient pressure to be measured exceeds the pressure within the envelope, the reflector is carried by the flexible envelope wall into the first position, reflecting more light to the first light guide; hence the first light detector receives more light than the second. In response to this unbalanced condition, the control means increases the pressure in the fluid source and envelope, causing the reflector to be carried into the second position, reflecting more light to the second light guide; hence the second light detector receives more light than the first. In response to this oppositely unbalanced condition, the control means decreases the internal pressure, causing the reflector to return to the first position.

This detector may be operated either by hand or automatically. If automatic control is employed, as by the use of a servo mechanism, such a servo mechanism may be designed to maintain an air pressure in the envelope that equals the ambient pressure. Thus, the sensor does not operate continuously by switching between the two unbalanced conditions but remains in the third (equilibrium condition), in which equal light intensities reach the two photo-cells until a change in the ambient pressure causes it to switch to one of the other (unbalanced) conditions.

In all preferred embodiments, especially adapted for the measurement of pressure within the skull of a living human being, the implantable envelope is of medical grade silicone rubber and measures about ⅜inch × 7/16 inch × 5/64 inch. The pneumatic line is a tube of medical grade vinyl, of outside diameter of the order of 1/16 inch, and the fluid in the reservoir, pneumatic line and envelope is air. The light guides are carried within the pneumatic line from the implantable envelope to the exterior of the patient's skull for connection to the light source and photo-cell light detectors; these light guides are composed of a plurality of flexible light-conducting fibers, bundled together for light transmission, and have a diameter of about 0.005 inch.

Other objects, features, and advantages will appear from the following description of preferred embodiments of the invention, taken together with the accompanying drawings wherein:

FIG. 1 is a schematic view of apparatus according to a preferred embodiment of the invention, shown in use for monitoring intracranial pressure of a living human being;

FIG. 2 is a perspective view on a greatly enlarged scale of the implantable envelope portion of the apparatus;

Figure 3:
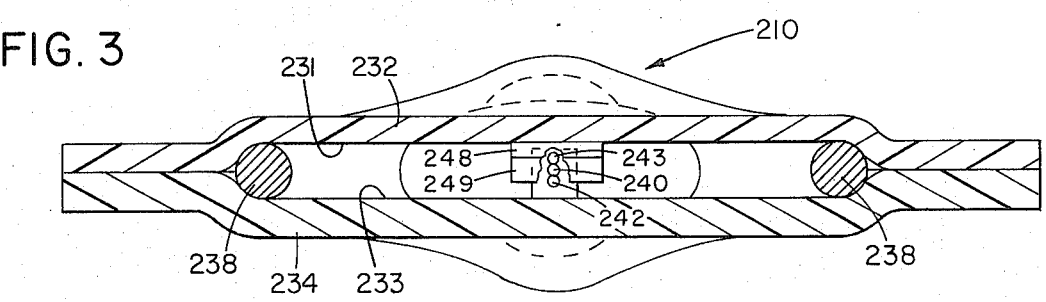
Figure 4:
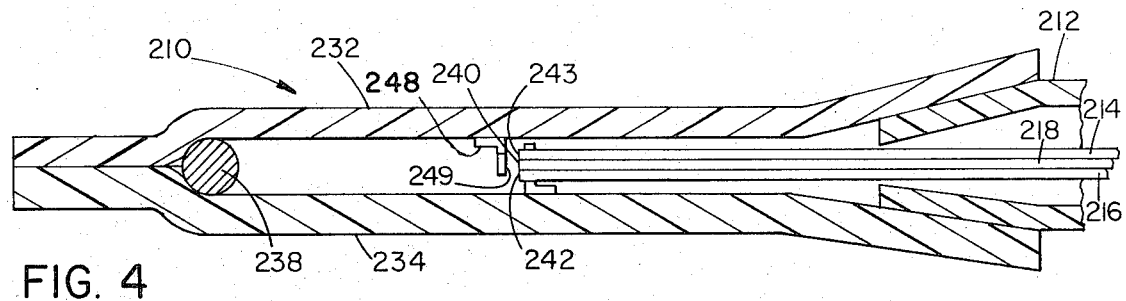
Figure 5:
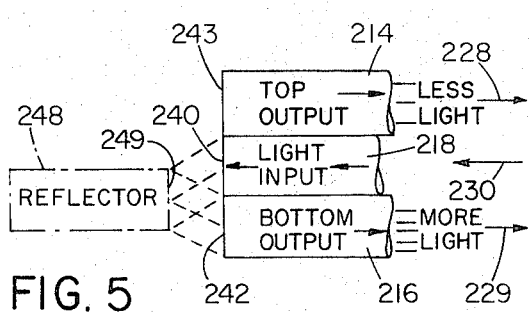
Figure 6:
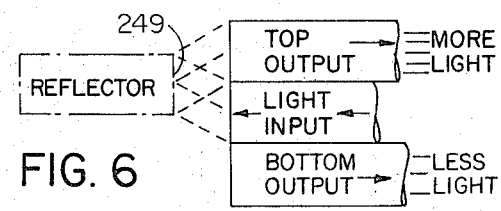
Figure 7:
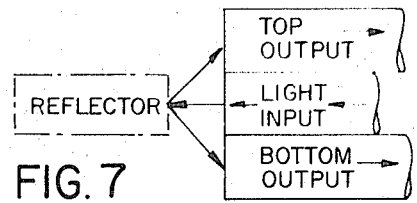

FIGS. 3 and 4 are cross-sectional views taken along the lines 3—3 and 4—4 respectively of FIG. 2; and FIGS. 5, 6 and 7 are details of a portion of the apparatus of the invention at three stages of its operation.

Referring now particularly to FIGS. 1 through 7, showing a preferred embodiment, an implantable resilient envelope generally designated at 210, is connected to a pneumatic line 212, carrying within it three light conducting lines 214, 216 and 218. Envelope 210, pneumatic lines 212 and light conducting lines 214, 216 and 218 are similar to the envelope, pneumatic line and light guides already described in applicant' co-pending U.S. Pat. No. 3,686,958.

Envelope 210 is introduced into the space between the patient's skull 220 and dura 223 through a scalp opening 224 and burr hole 227. The external end of pneumatic line 212 is connected to fluid reservoir 226, whose pressure is controlled by control means at 225. In preferred embodiments, this fluid is air; the air pressure in reservoir 226 is displayed on manometer 250. The external ends of light conducting lines 214, 216 and 218 respectively face two light detectors in the form of photo-cells 228 and 229, and a light source 230. Control means 225 is responsive to the difference in light intensities received by the two photo-cells 228 and 229.

Referring to FIGS. 3 and 4, implantable envelope 210 has a generally flat rigid wall portion 234 and a flexible movable upper wall portion 232, providing respectively opposed interior walls 233 and 231, and sealed together throughout most of their circumference as indicated at 236. The provision of a single flexible wall prevents the rough protrusions, found on the inner surface of the bone of some patients' skulls, from interfering with the operation of the sensor by displacing reflector 248; the rigid wall of the envelope may be placed adjacent the bone, while the flexible active wall faces the dura enclosing the brain and provides an accurate measure of the pressure.

Frame 238 maintains the planar form of envelope 210, permitting expansion and contraction of envelope 210 only in the direction transverse to frame 238. Within envelope 210, input guide 218 ends in flat face 240, and output guides 214 and 216 end in flat faces 243 and 242. Upper interior envelope wall 231 carries a reflector 248, extending perpendicularly towards opposite interior wall 233 and providing reflective face 249 generally parallel to faces 240, 242 and 243.

In operation, referring now particularly to FIGS. 2, 5, 6 and 7, air is initially pumped into envelope 210 through tube 212. When the internal air pressure exceeds the intracranial pressure outside the envelope (FIG. 6), resilient wall portion 232 is forced away from rigid wall 234 into the position in which reflective face 249 is adjacent light guide end faces 240 and 243; as a result, most of the light from input guide 218 is reflected to face 243 of top light guide 214, and is transmitted thereby to photo-cell 228. In response to the greater intensity received at photo-cell 228, control means 225 acts on fluid reservoir 226 to reduce the pressure in tube 212 and envelope 210. When the ambient intracranial pressure rises above the pressure within envelope 210, flexible wall 232 is forced inwardly (FIG. 5), carrying reflector 248 into the position adjacent faces 240 and 242, so that more light is received at photo-cell 229. Control means 225 responds by increasing the pressure in line 212 and envelope 210, causing a return to the first position. Thus the differential detector continuously "hunts" a zero pressure differential between its internal pressure and the external intracranial pressure.

If desired, automatic control means may be provided, designed to stop hunting when the internal air pressure is equal to the external intracranial pressure. In this condition, reflector 248 is in the position (FIG. 7) in which equal amounts of light are reflected to faces 242 and 243, and equal intensities are received at photocells 229 and 228. In this condition the pressure in envelope 210 is instantaneously equal to the ambient pressure in the brain, and the appropriate value is read on display manometer 250 or other display means. No change occurs unless the intracranial pressure changes, causing an imbalance in the light intensities received at photo-cells 229 and 228.

It will be seen that in all forms of the invention the elimination of all electrical lines to the patient greatly improves the safety factor in use of the equipment for intracranial pressure monitoring.

While there are herein disclosed and described presently preferred embodiments of the invention, it will be appreciated that such description is not intended to be limiting.

What is claimed is:

1. For use in apparatus for monitoring ambient pressure within a confined space, said apparatus including a light source, two light detectors, a source of fluid under pressure, control means for controlling the pressure of said fluid in accordance with the difference between the intensities of light sensed by said light detectors, and display means for displaying said pressure, a differential sensor unit comprising an envelope adapted to be placed within the confined space, said envelope having at least one wall movable in response to change in relative pressure between the interior and exterior of said envelope, a fluid conducting line in communication with the envelope interior and adapted to be connected to the fluid source, three light guides each having an internal end within said envelope, and of whose external ends, the first and second each face a light detector, and the third faces the light source, light-modulating mechanism mounted within said envelope in operative relation to the internal ends of said light guides to vary the light transmitted from the internal end of said third light guide to the internal ends of said first and second light guides and correspondingly to vary the intensity of light sensed by each of said light detectors, said light-modulating mechanism being relatively movable with respect to said internal ends responsive to movements of said movable wall, said internal ends and said light-modulating mechanism being so disposed and arranged that in a first position of said light-modulating mechanism a majority of the light from the light source is transmitted from said third light guide through said first light guide to the first light detector, in a second position of said mechanism a majority of said light is transmitted through said second light guide to the second light detector, and in a third position equal amounts of said light are transmitted to the two light detectors, said light modulating mechanism being movable through a range of positions including said first, second and third positions.

so that said control means acting through said pneumatic line will adjust the internal pressure in said envelope in accordance with the difference between the light intensities sensed by the detectors, whereby said internal pressure continually spans said ambient pressure and said display means continually displays said internal pressure.

2. The combination of claim 1 wherein said light modulating mechanism comprises a reflector serving in one position primarily to reflect said light from said third to said first internal end, in a second position primarily to reflect said light from said third to said second internal end, and in a third position to reflect light from said third internal end equally to said second and first internal ends.

3. The combination of claim 2 wherein said internal ends are side by side with their faces facing in the same direction and said reflector is arranged to move between a first position adjacent said first internal end, a second position adjacent said second internal end and a third position equidistant from said first and second ends.

4. The combination of claim 1 where said envelope has one rigid wall, said light guides extending within said envelope generally parallel to said rigid wall, said internal ends being generally transverse to said walls,
  said first internal end being adjacent said rigid wall, said second internal end being adjacent said flexible movable wall, and said third internal end being between the other two,
  and said reflector being carried on said movable wall and having a face parallel to said internal ends.

* * * * *